Nov. 3, 1936.    R. H. RUSSELL    2,059,536
PROCESS FOR PRODUCING GAS FROM EMULSIFIED MIXTURES
Original Filed Feb. 4, 1930    2 Sheets-Sheet 1

Inventor
R. H. Russell
By Seymour & Bright
Attorneys

Patented Nov. 3, 1936

2,059,536

UNITED STATES PATENT OFFICE 2,059,536

PROCESS FOR PRODUCING GAS FROM EMULSIFIED MIXTURES

Robert H. Russell, Cleveland, Ohio, assignor to Gas Fuel Corporation, New York, N. Y., a corporation of Delaware Original application February 4, 1930, Serial No. 425,857. Divided and this application March 25, 1931, Serial No. 525,294

6 Claims. (Cl. 48—197)

This invention relates to the production of gas from an emulsion including hydrocarbons, and to a novel method and apparatus for making and treating gas derived from such an emulsion. The present application is a division of my application Serial No. 425,857, filed February 4th, 1930.

It is well known that at the present time, oil emulsions are generally treated in order to dehydrate the same. The dehydration method may be classified into six groups, as follows: 1, gravity settling; 2, heat treatment; 3, electrical treatment; 4, chemical treatment; 5, centrifugal treatment; and 6, filtration. It has been found necessary to treat emulsified oils by such methods before subjecting the oil to refining processes.

I have found that in processing relatively heavy oils, for instance, low grade hydrocarbons, such as heavy crude petroleum, oil field emulsions, still bottoms and the like, it is advantageous to thoroughly mix the same with aqueous fluids, providing the mixture is admixed with a gaseous agent such as air, $CO_2$ or the like. For example, I have discovered that if heavy hydrocarbons, water and a suitable gas are thoroughly agitated in the presence of one another under super-atmospheric pressure, that an emulsion will result, in which each globule of gas or other elastic fluid is coated with a film of water arranged within a film or coating of the oil, and this emulsion will remain in such condition indefinitely, so that it may be immediately or subsequently processed to produce a fixed gas.

The primary object of the invention is to provide a process in which still bottoms or the like are employed in the manufacture of an emulsion particularly suitable for gas producing purposes.

Another object is to furnish a process in which an emulsion of the above mentioned nature can not only be heated for conversion purposes, but may be heated by catalytic means, which functions to ionize the fluid treated.

With the foregoing objects outlined and with other objects in view which will appear as the description proceeds, the invention consists in the novel features hereinafter described, in detail, illustrated in the accompanying drawings, and more particularly pointed out in the appended claims.

Referring to the drawings.

The apparatus employed for producing an emulsion of the type used in the present invention, is disclosed in the above mentioned application and comprises a closed chamber capable of withstanding relatively high super-atmospheric pressures, and provided with horizontally disposed rotatable shafts, each having along its length a multiplicity of agitating blades or arms that violently stir any fluids within the casing.

In accordance with the present invention, for example, low grade hydrocarbons, such as heavy crude petroleum, oil field emulsions, still bottoms and the like, which are ordinarily unsuitable or uneconomical for use in making gas are introduced into the casing along with water and a suitable gas, such as air.

If the mixing process is carried on as a batch operation, a suitable quantity of compressed air or other suitable gas will be introduced into the casing and after the desired proportions of oil, aqueous liquid and gas are introduced, the shafts will be rapidly rotated to cause the blades to violently agitate the contents of the casing, so as to force the constituents to coalesce and tenaciously adhere to one another. Under the microscope it has been found that the gas, such as air, due to the agitation, will disperse and form globules or bubbles, each one of which will be coated with a film of water contained within a skin of oil, and it has been found that an emulsion of this nature will remain in the emulsified condition indefinitely. Actually, such an emulsion has remained in stable condition for a period of more than a year without any noticeable stratification.

The amounts of air and water used in the emulsion manufacturing phase of the invention, will vary and depend on the characteristics of the oil processed.

I may also mix the constituents continuously instead of by batch treatment.

I may state however, that in operating the agitator, whether for the batch or continuous process, the oil, water and gas should be introduced in proper proportions, and in the casing should be operated upon under pressure to produce the emulsion which may be subsequently used as charging stock for gas making.

Figure 1:
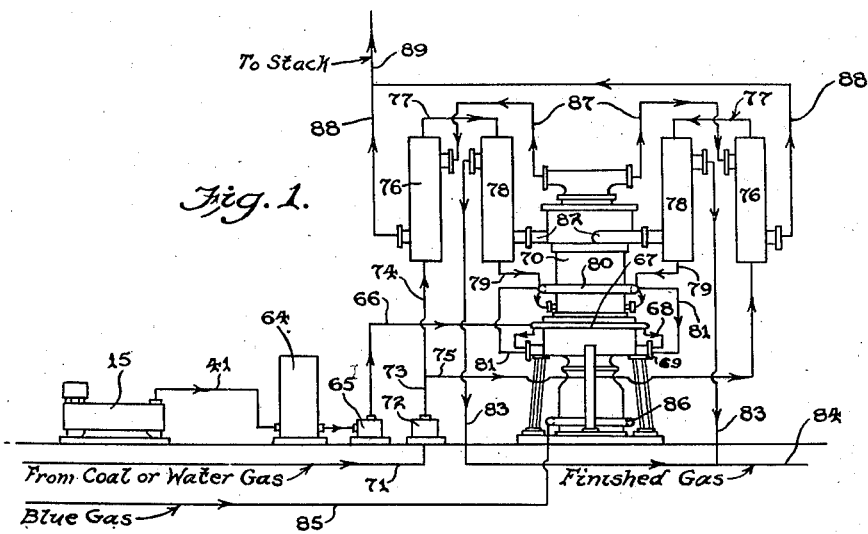
Fig. 1 is a diagrammatic view of an apparatus designed to use the emulsion for the manufacture of oil gas.

As heretofore stated, an emulsion manufactured as above outlined, is especially suitable for the production of an oil gas. For example, as shown in Fig. 1, the emulsion from the mixer 15, may be discharged by way of pipe 41, into a suitable storage tank 64, from which it is forced by a pump 65 through a conduit 66, into a manifold 67 having outlet branches 68 leading to atomizers 69. These atomizers discharge into a chamber 70, the interior of which may be heated by any suitable means, for the purpose of cracking the mixture into a fixed gas. In this procedure, I prefer to mix the emulsion as it enters the chamber 70 with some other suitable gaseous agent such as coal or water gas, natural gas, or the like. For instance, coal or water gas may be drawn through a pipe line 71, and forced by a pump 72 into a conduit 73 having branches 74 and 75 which lead to heat exchangers 76, in which the temperature of the coal or water gas is raised. From these exchangers, the gas passes by way of pipes 77 to other heat exchangers 78, and from the latter, it passes through conduits 79 into a manifold 80 which preferably surrounds the heating chamber 70. From the manifold, the added gas passes by way of branches 81 into the atomizers 69, and as the added gas is highly heated in this way while it is traveling through the atomizers, it will be understood that in the latter, it will impart its heat units to the emulsion from the mixer 15.

As before stated, in chamber 70, the mixture of highly heated gas and emulsion will be subjected to additional heat supplied by any suitable means, and the heat will be sufficient to convert the mixture in the chamber 70 into a fixed gas. If desired a catalyzer may be introduced into the chamber 70 to aid the reaction. This highly heated gas will be discharged from the chamber 70 by way of outlet pipes 82, and after passing through the heat exchangers 78, will enter the branches 83 which lead it to the finished gas line 84.

If the chamber 70 is heated by burning, for instance, water gas, such gas, may enter the system by way of pipe 85 which connects with a manifold 86 that communicates with burners (not shown), within the gas producer. The gaseous products of combustion from these burners is kept from contact with the gas produced by any suitable means, and such products of combustion are discharged at the top of the producer by means of conduits 87 which lead to the heat exchangers 76. From the latter, the products of combustion are led by way of pipes 88 to a line 89 that is joined to the stack of the plant.

It will be clear to those skilled in the art that the hot finished gas passing through the heat exchangers 78, and the hot products of combustion passing through the exchangers 76, will function to highly preheat the cold water or other gas which enters the system through the pipe 71 before such gas reaches the manifold 80, and of course, in the heat exchangers, the finished gas and products of combustion will be cooled.

Figure 2:
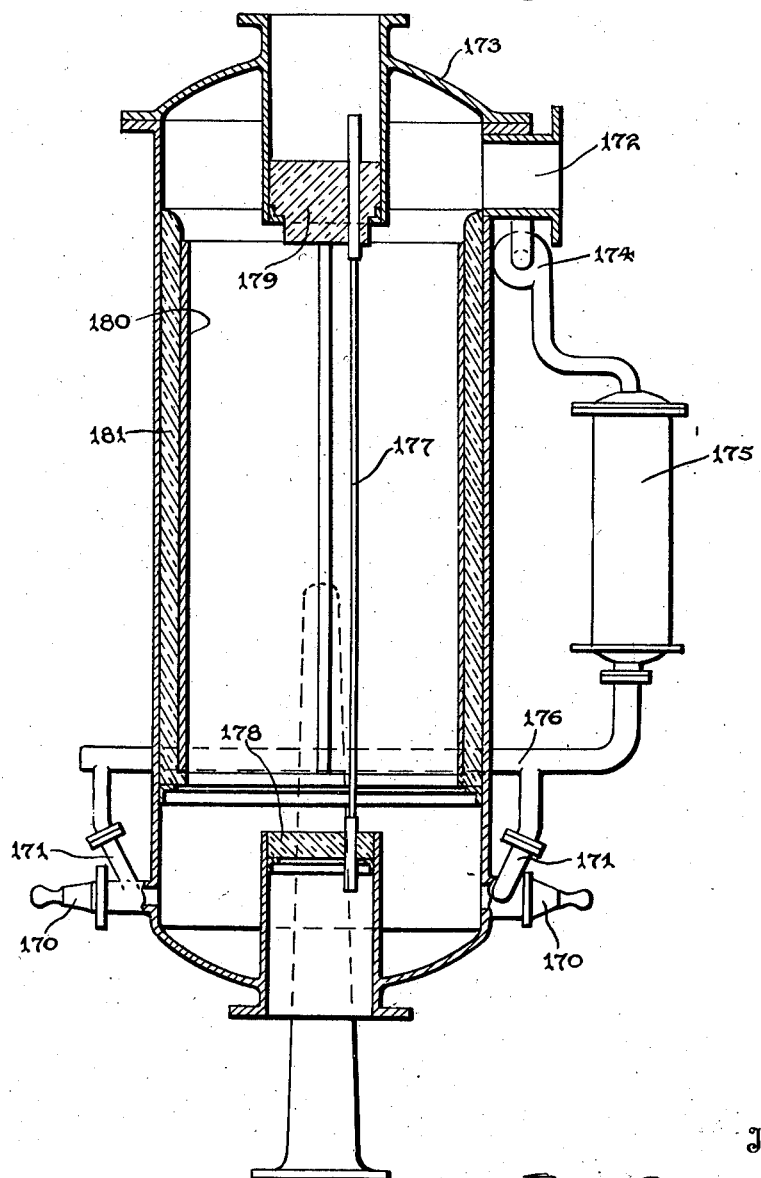
Fig. 2 is a vertical sectional view of an apparatus in which electric heating elements function as catalyzing means as well as for ionization purposes in the production of a fixed gas.

In an alternative method, some gas, such as natural gas, water gas, etc., is substituted for the heated air in the mixer, and additional heated gas at a temperature of 1000° F. to 1200° F. is used in the atomizers 170, Fig. 2, and this hot gas will be supplied to the atomizers by means of inlets 171, so that in the atomizers, it will be mixed with the emulsion coming from the mixer. The inlets 171 may be supplied with this hot gas from the outlet 172 of a reaction chamber 173, and it will be fed by a rotary compressor 174 through an electrically heated chamber 175, which communicates with a manifold 176, leading to the inlets 171.

The mixture of the emulsion and hot gas from the atomizers 170 is injected and expanded into the lower portion of the reaction chamber, which contains electric heating elements 177 which have their ends arranged in suitable insulating plugs 178, 179, and cooperate with a nichrome tube 180, which is positioned within an insulating tube 181, arranged within the shell of the reaction chamber. The temperature of the elements 177 (only one of which is shown to facilitate illustration), is maintained preferably between 2500 and 3500° F., and as the nichrome tube 180 or its equivalent is electrically connected to the positive side of the current supply, an electro-static field is produced between the heat element and the plate. The fixed or semi-fixed gas, as it rises through this electro-static field, is ionized and becomes a permanent gas, which may be stored in any conventional manner, and it is a portion of this ionized gas which is preferably recycled by means of the compressor 174, and used as the added gas which is injected into the atomized and expanded compound in the atomizers 170.

From the foregoing it will be understood that I have devised novel methods and apparatus for producing gas from an emulsion of hydrocarbons, air or other gas, and an aqueous liquid; such gas may be used for illumination, heating, etc.

The invention permits the production of a gas from low grade hydrocarbons, such as heavy crude petroleum, oil field emulsions, still bottoms and the like, which are ordinarily unsuited for such use.

The treatment outlined herein produces a practically permanent gas, which contains, due to the breaking up of the water, a large portion of the oxygen necessary to produce complete combustion. This permanent gas may be passed to a burner proper, where additional heated air under pressure, in amount sufficient to produce complete combustion, is admixed with the same.

In reference to the terms "blue water gas" and "water gas" mentioned above, it will be noted that "blue water gas" is a well known term used in the art to designate water gas which does not give a luminous flame, as distinguished from the ordinary carbureted water gas.

While I have disclosed the principle of my invention, as well as my methods and apparatus in such manner that they may be readily understood by those skilled in the art, I am aware that changes may be made in the details disclosed, without departing from the spirit of the invention, as expressed in the claims.

What I claim and desire to secure by Letters Patent is:

1. In a process for making oil gas from an emulsified mixture comprising an aqueous liquid, low grade and high specific gravity hydrocarbons and a gas under superatmospheric pressure, substantially permanent in character and in which the components do not tend to separate, the steps of admixing said mixture with a highly heated gas, atomizing said admixture into a heating zone, and subjecting said admixture in said zone to sufficient heat to convert the admixture into a fixed gas.

2. In a process of the character described, producing a substantially permanent emulsified mixture comprising a multiplicity of minute gas globules surrounded by films of water and low grade and high specific gravity hydrocarbons in the order named, introducing said mixture under superatmospheric pressure into a heating zone, admixing a highly heated combustible gas with said mixture before introducing the admixture into the zone, and subjecting the admixture in said zone to sufficient heat to convert the admixture into an oil gas.

3. In a process of the character described producing an emulsified mixture comprising an aqueous liquid, low grade and high specific gravity hydrocarbons and a gas under superatmospheric pressure, substantially permanent in character and in which the components do not tend to separate, admixing said mixture with a highly heated combustible gas derived from carbonaceous material, introducing the admixture under superatmospheric pressure into a heating zone, and heating the admixture in said zone to a temperature sufficient to convert the admixture into a fixed oil gas.

4. In a process of the character described producing an emulsified mixture comprising an aqueous liquid, low grade and high specific gravity hydrocarbons and a gas under superatmospheric pressure, substantially permanent in character and in which the components do not tend to separate, mixing said mixture with a highly heated combustible gas derived from carbonaceous material, introducing the admixture under superatmospheric pressure into a heating zone, heating the admixture in said zone to a temperature sufficient to convert the admixture into a fixed oil gas, discharging the hot oil gas from said zone, and utilizing the discharged gas to preheat the gas derived from carbonaceous material before the last-mentioned gas is admixed with said mixture.

5. In a process of the character described producing a substantially permanent emulsified mixture comprising a multiplicity of minute gas globules surrounded by films of water and low grade and high specific gravity hydrocarbons in the order named, said gas globules being of the group consisting of air, carbon dioxide, natural gas or water gas, mixing said emulsified mixture with a highly heated combustible gas of the group consisting of coal gas, natural gas or water gas, and subjecting said admixture to sufficient heat to convert the same into a permanent combustible gas.

6. In a process of the character described, producing a substantially permanent emulsified mixture comprising a multiplicity of minute gas globules surrounded by films of water and low grade, high specific gravity hydrocarbons in the order named, admixing said mixture with a combustible gas derived from carbonaceous material, atomizing the admixture in highly heated condition and under pressure into a heating zone, and subjecting the admixture in said zone to sufficient heat to convert the same into a fixed oil gas.

ROBERT H. RUSSELL.